UNITED STATES PATENT OFFICE.

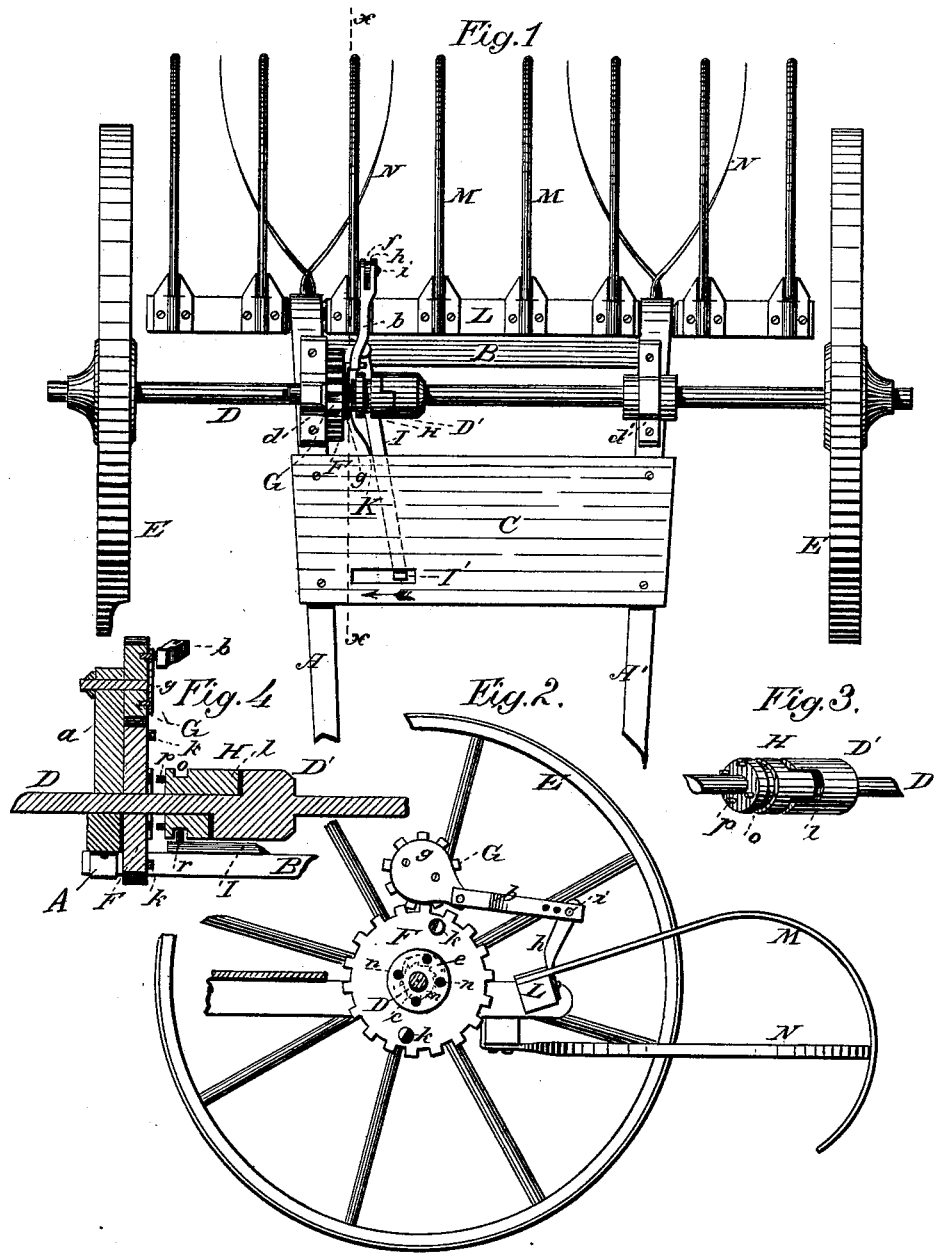

MIFFLIN P. DENNEY, OF GAP, PENNSYLVANIA.

IMPROVEMENT IN HORSE HAY-RAKES.

Specification forming part of Letters Patent No. 189,707, dated April 17, 1877; application filed December 8, 1876.

*To all whom it may concern:*

Be it known that I, MIFFLIN P. DENNEY, of Gap, in the county of Lancaster and State of Pennsylvania, have invented certain new and useful Improvements in Horse Hay-Rakes; and I do hereby declare that the following is a full, clear, and exact description thereof, which will enable others skilled in the art to which it appertains to make and use the same, reference being had to the accompanying drawings, which form a part of this specification, and in which—

Figure 1 is a top plan. Fig. 2 is a vertical cross-section taken through the line $x\ x$ in Fig. 1. Fig. 3 is a perspective view of the clutching mechanism detached, and Fig. 4 is a longitudinal section through the axle with the clutch and operating mechanism.

Similar letters of reference indicate corresponding parts in all the figures.

My invention relates to that class of horse hay-rakes in which the teeth are raised automatically to discharge the hay by the advance of the machine; and it consists in the construction and arrangement of a device whereby the rake head and teeth, after discharging the accumulated hay, will be lowered gradually and easily back to their normal position for raking, thus avoiding the jar and wear caused by the teeth dropping suddenly, by their own weight, back upon the ground, and also obviating the danger of the points of the teeth taking hold in the soil, which is frequently the case with self-dumping rakes as ordinarily constructed.

In the drawing, A A' are the shafts, which are connected at their rear ends by a cross-bar, B, and a little in front of their rear ends by a foot board or bar, C. D is the axle, which rests in bearings $d\ d'$ upon shafts A A', between the bars B and C, and upon the journals of which the wheels E revolve. The hub of each wheel is, preferably, provided with a spring-pawl, $e$, as indicated in dotted lines in Fig. 2, which engages with a ratchet-pinion rigidly affixed upon each end of the axle, so that when the rake is backed the wheels will revolve without turning the axle, while when the machine is advancing the pawl will engage with the pinion $c$ and rotate the axle.

F is a gear-wheel running loosely upon axle D, on the inside of one of the shafts A, which meshes with a smaller gear-wheel, G, pivoted on a lug projecting from an upright, $a$, bolted onto shaft A above the bearing $d$. Wheel G may be made either one-half or one-third the size of wheel F, according to whether it is desired to raise and lower the rake head and teeth at each one-half revolution of the wheels, or at each one-third revolution. Secured upon the face of wheel G is a crank-pin, $g$, pivoted upon which is an arm, $b$, the other end of which has a slot, $f$, fitting over the arm or bracket $h$, affixed upon the rake-head. The slotted end of arm $b$ has a series of perforations, so that bracket $h$ may be adjusted, by means of a pivot-pin, $i$, within the slot, so as to adjust or regulate the pitch of the teeth.

Secured upon the face of the larger gear-wheel F are two pins, $k\ k$, placed diametrically opposite to each other, and having beveled or sloping points. Between these pins, concentric with the axle D, upon which the wheel F rotates, is a clutch, $m$, consisting, in this case, simply of a projecting annular disk or shoulder, having four holes or depressions, $n$.

The clutch mechanism by which gear-wheel F is operated consists of the coupling shown in detail in Figs. 3 and 4, in which D represents the axle, and D' the clutch-collar secured rigidly upon the axle.

H is a sleeve, sliding loosely upon axle D, and engaging, by its fingers $l$, with the clutch-collar D', so as to always rotate with the axle. This sliding sleeve has a circumferential groove or depression, $o$, and is provided on that end which faces wheel F with four projecting pins, $p$, which, when the sleeve is brought to bear against the face of wheel F, will fit into the recesses $n$ of clutch $m$. The fingers $l$ are of such a length that they will never become disengaged from the clutch-collar D', whatever may be the position of sleeve H upon the axle D.

The position of the sleeve upon the axle is regulated by a lever-arm, I, pivoted upon the cross-bar B, and passing forward under the foot-board C, where it is bent, its bent arm I' passing up through a segmental slot in the foot-board. Attached to one side of lever I is a spring, K, which bears against the face of wheel F, and secured upon its upper side is a projection or lug, r, which fits into the circumferential groove o of sleeve H. From this arrangement it will be seen that when lever-arm I is pushed, by the foot of the driver, in the direction of the arrow, Fig. 1, sleeve H will be moved so as to engage with the clutch m of wheel F, which will be rotated, and operate the smaller gear-wheel G, which, in turn, will operate the reciprocating arm h, whereby the rake-head L and teeth M will be elevated. The forked fingers N, secured upon the ends of shafts A A', will disengage the hay from the teeth as these are being raised, after which, one-half (or one-third, as the case may be) revolution of the wheels having been completed, the rake head and teeth are again lowered gradually and automatically, slowly or quickly, according to the rate of speed of the machine, but never suddenly.

The pins k k on the face of wheel F will throw the clutch-sleeve H out of gear with the clutch m by their beveled points coming in contact with the spring K, affixed upon the side of lever-arm I, after each operation of raising and lowering the teeth, so that the rake will remain down until again raised by pushing the bent arm of I, in the manner described. When wheel G is only one-third the size of the larger wheel F, it is obvious that there should be three, instead of two, pins on the face of wheel F.

Having thus described my invention, I claim and desire to secure by Letters Patent of the United States—

In a horse hay-rake, the combination of the axle D, having rigid clutch-collar D', sliding sleeve H, having fingers l and projections p, loose gear-wheel F, having clutch m, pinion G, and reciprocating rod b, all arranged to operate substantially in the manner and for the purpose herein shown and specified.

In testimony that I claim the foregoing as my own I have hereto affixed my signature in presence of two witnesses.

MIFFLIN P. DENNEY.

Witnesses:
SALLIE DENNEY,
MAGGIE L. DENNEY.